Patented Jan. 7, 1941

2,228,061

UNITED STATES PATENT OFFICE 2,228,061

PLASTIC COMPOSITION

Frederick J. Maas, Chicago, Ill., assignor of one-half to Alex J. Prominski, Chicago, Ill.

No Drawing. Application February 18, 1939,
Serial No. 257,173

3 Claims. (Cl. 106—29)

This invention relates to improvements in plastics and, more particularly, the invention relates to a composition so constituted that the same may be advantageously and effectually used as a coating or covering for various characters of surfaces, as for example, brick, cement, concrete, plaster, fiber or plaster or other composition wallboards, etc., whereby to water and element proof the same, as well as to provide a highly decorative finish thereto.

It is also an object of the invention to provide a coating composition which, when applied to or over a surface, will endure thereupon unaffected by moisture, water, the elements or by many of the mild or weak acids, salt or saline solutions, or gases.

Moreover, the invention aims to provide a coating composition of the stated character capable of being applied to surfaces by those methods now customary or usual in the art, including its application by brush, blade or spray and which, when applied to a surface, will quickly dry and set, but, nevertheless, maintain a bodily or inherent elasticity entirely sufficient to enable the same to successfully withstand climatic or sharp temperature changes without liability of cracking, flaking, or shedding from such coated surface.

Yet another object of the invention is to provide a coating composition whose consistency, density, or viscosity may be readily varied (increased or decreased), from that comparable to a free-flowing paint to a cementitious-like body, without in any way detracting from its adhesive, resistant, or enduring qualities.

The invention furthermore has for an object to provide a composition comprehending remarkable adhesive qualities, the efficiency of which is such as to render the same capable of effectual usage as a binder, bonding cement, or acid, gaseous or liquid-resistant joint coating or the like.

Another object of the invention is to provide a coating composition capable of extremely economical production and which, by reason of its method of production, may be kept or stored, when properly packaged, for prolonged periods of time without deteriorating.

Other objects of the invention will be in part obvious and in part pointed out hereinafter.

In order that my invention and the mode of producing the same may be understood by workers skilled in the art to which it pertains, I have, in the accompanying description set forth certain embodiments thereof.

A typical formula for producing one embodiment of the plastic composition is as follows:

| | Per cent |
|---|---|
| Magnesium oxide | 40 |
| Silica (140 mesh) | 30 |
| Calcium carbonate | 20 |
| Fluorspar | 3 |
| Formaldehyde | 2 |
| Zinc oxide | 5 |

The above stated components are thoroughly intermixed to provide a dry product. To this dry product, I add and thoroughly admix a liquid vehicle composed of magnesium chloride mixed with water to a specific gravity of approximately thirty-one degrees (31°) Baumé. Dependent upon the desired consistency or density of the plastic coating composition, the amount of the magnesium chloride solution is either increased or decreased. This is to say, if it is desired to produce a plastic composition with a consistency or density of a free-flowing paint, obviously, the amount of the magnesium chloride solution added to the aforesaid dry mixture is increased and, conversely, it is proportionately decreased to produce a plastic composition of heavier consistencies or densities as, for example, when such composition is to be blade or similarly applied, or is to be utilized as a cement.

Should it be desirable that a plastic coating composition similar to that hereinbefore described shall be produced with definitely increased corrosion-resisting properties and, particularly, when such coating composition is not intended for usage in coating or application to the surfaces of iron or iron alloy objects or products, I reduce the quantity of the component zinc oxide from five percent (5%), as aforesaid, to two and one-half percent (2½%), and add a quantity of aluminum oxide representing two and one-half percent (2½%) of the above described composition.

In using my improved coating composition, the same is applied, according to the density of such composition, to surfaces to be coated or treated therewith, either by brush, spray, immersion, blade, or in other manners well-known and customary in this particular art. The composition, when applied, will quickly dry and set and will constitute a surfacing capable of taking and maintaining a high gloss or finish and, also, a surface which will be extremely hard and entirely capable of successfully withstanding extremely rough usage, as well as being efficiently repellent to water or moisture, the elements, and to many characters of acids, salt or saline solutions, and gases. The composition, when hardened and set upon a receiving surface is also most efficient in withstanding intense heats without discoloration and without cracking or fissuring.

The composition is effectually usable as a joint coating material, whereby fluid-tight jointures may be effected between sections of conduits, pipes, or the like, and will also serve as a positive binding agent for such jointures. By increasing the consistency or density of the plastic composition, as by proportionately decreasing the magnesium chloride solution, in the manner hereinbefore referred to, a highly efficient bonding cementitious material will be produced. Such cementitious material will be found highly advantageous and entirely efficient and practical for usage in bonding together of various building materials, including brick, tile, fiber and other composition boards and objects, etc., permitting of the production of an extremely tenacious and enduring bond between articles or objects thus joined or bonded together.

When utilized as a paint or coating composition, various characters of ornamental finishes may be effected upon the coated articles or objects. Stucco or so-called Spanish types of decorative finishes of enduring characteristics are capable of being produced thereby, or, if desired, entirely smooth, uniform and highly glossy finishes, simulating the finish of porcelain, may be effected with usage of the material as a surface coating composition; this latter being accomplished by applying a coating of the composition to an article or object and while the same is in its "green" or wet state, applying a smooth and sufficiently heavy sheet thereover, then allowing the coating composition to harden and set, following which said sheet is removed to expose a surface having the smoothness of porcelain or like material and in appearance closely simulating the same.

The hereinbefore set forth formula for producing my improved plastic coating composition, it is to be understood, presents a typical embodiment of the invention. However, it is also to be understood that the relative proportions of the components of the formula may be varied, according to instant manufacturing requirements or dictates. To this end, a formula within the component range set forth immediately below is considered to be entirely within the spirit and province of the herein disclosed invention:

| | Per cent |
|---|---|
| Magnesium oxide | 20 to 50 |
| Silica (of suitable mesh) | 10 to 50 |
| Calcium carbonate | 5 to 25 |
| Fluorspar | 1 to 10 |
| Formaldehyde | 1 to 5 |
| Zinc oxide | 1 to 15 |

The liquid vehicle for the foregoing dry mix, i. e., magnesium chloride with water to produce a solution possessing a specific gravity of from twenty degrees (20°) to forty degrees (40°) Baumé. As in the case of admixture of the liquid vehicle described in connection with the herein stated specific and typical embodiment of the invention, the immediately above referred to magnesium chloride solution is added in desired or proper quantities to a dry mix produced in accordance with the ranges of the above set forth formula.

Plastic compositions produced in accordance with the teachings of my invention and, particularly, when such plastic compositions are of proper density, may be advantageously used for the production of various molded articles or objects which may possess either or both decorative and utilitarian features or characteristics. Molded articles thus produced will be entirely impervious to water or moisture and effectually repellant to many characters of acids, salt or saline solutions, gases, etc., and, in addition thereto, such objects will be possessed of material tensile strengths and degrees of hardness.

By the usage of magnesium oxide, an effectual base and hardener is accorded the composition. The component silica also serves as a base for the composition and adds to its hardening or setting efficiency. The calcium carbonate content of the composition, I have found, will absorb a quantity of the water content of the composition, and, moreover, it will absorb or neutralize some of the salt content of the magnesium chloride solution and prevents the composition from "sweating." It moreover serves as a filler for the composition. Additionally, its lime content materially increases the chemical reacting efficiency of the composition.

The usage of fluorspar in the composition serves to neutralize and absorb some of the gases given off by the aforesaid magnesium chloride solution and the magnesium oxide and, moreover, it fills some of the voids left by or occasioned by the liberation of those gases resulting from chemical reaction of the composition following its application.

The formaldehyde component serves as an effectual water proofing and hardening agent for the composition. By the addition of zinc oxide to the composition, a dual utility is effected in that the same functions to absorb the residual salts and betters the whiteness of the composition.

The magnesium chloride solution provides a base for the composition and likewise serves as a hardening agent therefor.

The improved composition, when applied to surfaces of articles or objects, I have found by actual experimentation, will harden and set within about three (3) hours from the time of its original application; moreover, the composition will effectually "cure" within approximately three (3) days from the time of its application.

I claim:

1. A plastic coating composition of the character described, comprising the following elements in approximately the respective relative quantities indicated:

| | Per cent |
|---|---|
| Magnesium oxide | 40 |
| Silica | 30 |
| Calcium carbonate | 20 |
| Fluorspar | 3 |
| Formaldehyde | 2 |
| Zinc oxide | 5 |
| Magnesium chloride mixed with water to a specific gravity of approximately thirty-one degrees (31°) Baumé. | |

2. A plastic coating composition comprising the following elements in approximately the relative quantities indicated:

| | Per cent |
|---|---|
| Magnesium oxide | 40 |
| Silica | 30 |
| Calcium carbonate | 20 |
| Fluorspar | 3 |
| Formaldehyde | 2 |
| Zinc oxide | 2½ |
| Aluminum oxide | 2½ |

Magnesium chloride mixed with water to a specific gravity of thirty-one degrees degrees (31°) Baumé.

3. A plastic coating composition comprising the following elements in those quantities and within the ranges below indicated:

| | Per cent |
|---|---|
| Magnesium oxide | 20 to 50 |
| Silica | 10 to 50 |
| Calcium carbonate | 5 to 25 |
| Fluorspar | 1 to 10 |
| Formaldehyde | 1 to 5 |
| Zinc oxide | 1 to 15 |

Magnesium chloride mixed with water to a specific gravity of from twenty degrees (20°) to forty degrees (40°) Baumé.

FREDERICK J. MAAS.